United States Patent [19]
Schöne et al.

[11] Patent Number: 4,938,660
[45] Date of Patent: Jul. 3, 1990

[54] PUMP FOR VISCOUS FLUIDS

[75] Inventors: Karsten Schöne, Korb; Hans Nickel, Cottenweiler; Werner Geyer, Waiblingen; Roland Schierling, Affalterbach, all of Fed. Rep. of Germany

[73] Assignee: Andreas Stihl, Waiblingen, Fed. Rep. of Germany

[21] Appl. No.: 373,636

[22] Filed: Jun. 8, 1989

[30] Foreign Application Priority Data

Jun. 16, 1988 [DE] Fed. Rep. of Germany ....... 3820483

[51] Int. Cl.$^5$ .................................................. F04D 3/02
[52] U.S. Cl. .......................................... 415/90; 416/4; 418/152
[58] Field of Search ...................... 415/71, 72, 73, 74, 415/90; 416/4; 418/152, 156

[56] References Cited

U.S. PATENT DOCUMENTS

| | | | |
|---|---|---|---|
| 2,464,014 | 3/1949 | Wiltse | 415/72 |
| 2,764,101 | 9/1956 | Rand | 415/72 |
| 2,957,423 | 10/1960 | Audemar | 415/74 |
| 3,431,855 | 3/1969 | Kazantsev et al. | 415/72 |
| 3,734,654 | 5/1973 | Burenga et al. | 418/152 |
| 3,884,451 | 5/1975 | Stenmark et al. | 415/72 |
| 3,967,722 | 7/1976 | Dietert | 415/72 |
| 3,967,914 | 7/1976 | Gamell | 415/71 |
| 4,384,828 | 5/1983 | Rembold et al. | 418/152 |
| 4,747,762 | 5/1988 | Fairbairn | 418/152 |
| 4,772,177 | 9/1988 | Hayashi | 415/74 |

FOREIGN PATENT DOCUMENTS

| | | | |
|---|---|---|---|
| 2441247 | 9/1974 | Fed. Rep. of Germany | 415/90 |
| 0038191 | 2/1986 | Japan | 415/72 |
| 0149598 | 7/1986 | Japan | 415/72 |
| 0038897 | 2/1987 | Japan | 415/72 |
| 470658 | 8/1975 | U.S.S.R. | 415/72 |
| 0649885 | 2/1979 | U.S.S.R. | 415/90 |

*Primary Examiner*—Edward K. Look
*Assistant Examiner*—Hoang Nguyen
*Attorney, Agent, or Firm*—Walter Ottesen

[57] ABSTRACT

The invention is directed to a pump for use as a lubricating oil pump in internal combustion engines of handheld portable tools such as motor-driven chain saws or the like. The pump includes a body forming the stator and a body forming the rotor. These bodies lie coaxial with respect to each other and have respective surfaces which lie seal-tight against each other. A screw-shaped spiral slot is formed in one of these surfaces and has an input end connected to a suction connection and an output end connected with a pressure connection. According to a feature of the invention, at least the screw-shaped wall structure is made of an elastomer. This wall structure defines the spiral slot and lies against the smooth surface lying opposite thereto. An absolutely seal-tight contact engagement of the wall structure defining the spiral slot against the opposite-lying surface is assured by the elasticity of the elastomer. The service life of the pump is increased and its production and assembly simplified.

22 Claims, 5 Drawing Sheets

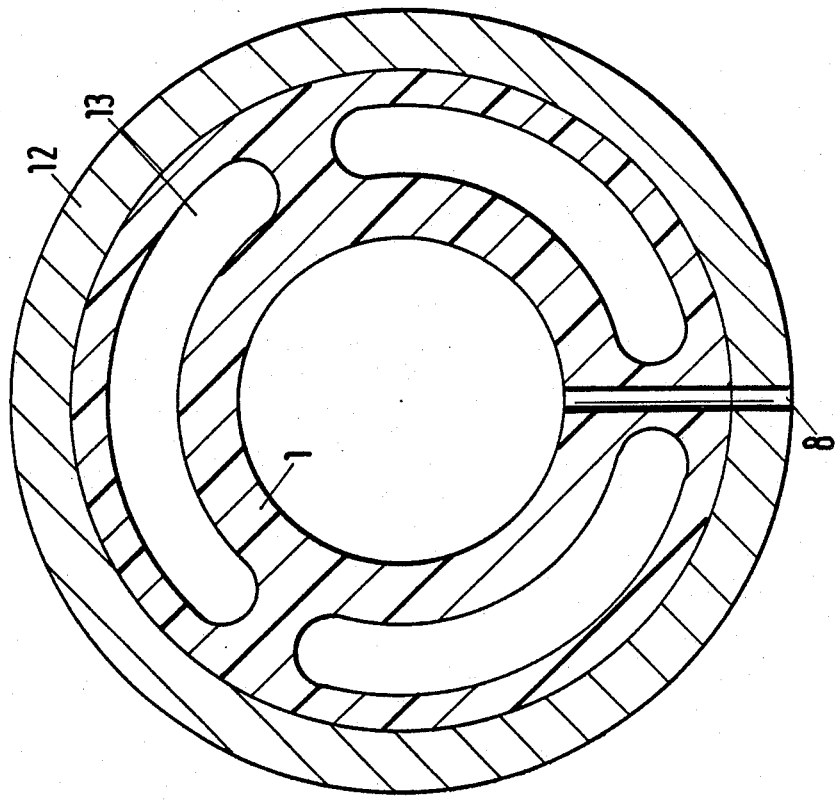
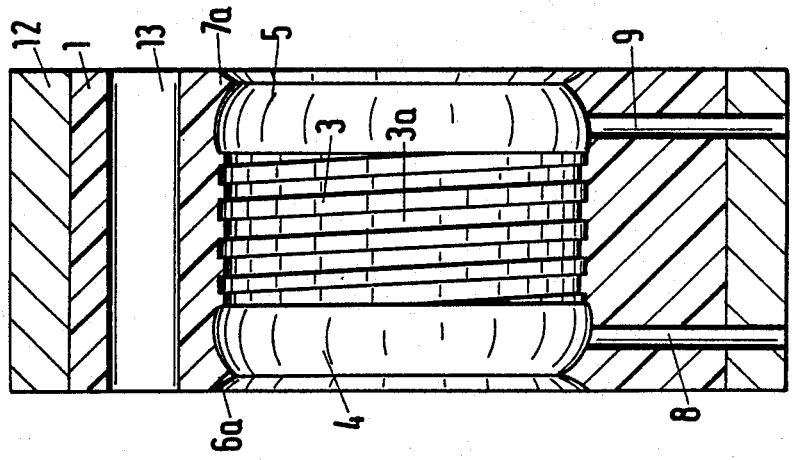

PUMP FOR VISCOUS FLUIDS

FIELD OF THE INVENTION

The invention relates to a pump for viscous fluids especially for use as a lubricating oil pump in internal combustion engines of handheld portable tools such as motor-driven chain saws or the like.

BACKGROUND OF THE INVENTION

A pump of the above kind is also known as a screw pump and is disclosed in German Patent No. 1,903,069. A rotor having a multiple spiral slot is attached to a shaft having a smooth outer surface in the manner of a roller bearing. The rotor rotates in a stator configured as an outer ring and the stator includes a suction connection for the pressure connection. The stator carries sealing plates at its axial ends which seal the pump with respect to the ambient. In order to make the operation of the known pump reliable, the pump must be submerged as deeply as possible in the liquid to be pumped.

If the pump lies only partially in the liquid to be pumped or outside of the latter, then it must be assured that no air can penetrate into the system to assure reliable operation. However, it has been shown in practice that play occurs between the stator and the rotor because of wear and this leads to a short circuit between mutually adjacent turns of the slot and also causes air to penetrate into the pump system. A short circuit between mutually adjacent turns as well as air in the system leads to a reduction of pump capacity and can also lead to a failure of the pump. Also, assembly errors such as a tilting during assembly can lead to a rapid pump failure.

SUMMARY OF THE INVENTION

It is an object of the invention to provide a pump of the kind described above which is easy to assemble and has a high service life without a reduction in pump capacity.

The pump according to the invention is for pumping viscous fluids and can be used especially as a pump for pumping lubricating oil in internal combustion engines of handheld portable tools such as motor-driven chain saws or the like.

The pump according to the invention includes: a first body defining a stator having a longitudinal stator axis; a second body defining a rotor having a longitudinal rotor axis, the rotor being rotatably mounted in the stator so as to be coaxial therewith; the stator having a smooth inner wall surface facing the rotor and the rotor having a smooth outer wall surface in seal-tight contact engagement with the smooth inner wall surface, the wall surfaces conjointly defining a surface interface; screw-shaped helical slot means disposed in surrounding relationship to the rotor axis; one of the bodies having a wall structure made of an elastomer at the surface interface so as to be in contact engagement with the smooth wall surface of the other one of the bodies; the wall structure being configured to define a screw-shaped spiral slot having respective ends and bounded by the smooth wall surface of the other one of the bodies; suction connection means formed at one of the ends for conducting the viscous fluid to be pumped into the slot; and, pressure connection means formed at the other one of the ends for conducting the viscous fluid out of the slot.

The configuration of the wall structure made of elastomer assures that a tilting of the stator and rotor during assembly will lead to no damage since the elasticity of the elastomer will permit larger axial deviations of the rotor to the stator. When the rotor and stator lie in their assembled positions, the elastically deformed wall structure again assumes its desired form which assures a tight contact engagement on the opposite lying surface. The assembly error has no effect on the operational capability or on the service life of the pump.

If wear occurs, it will be compensated for by the elastic elastomer whereby a high service life of the pump is obtained. Even after a longer operational time, the edge section continues to lie tightly on the opposite lying smooth surface and thereby prevents a short circuit between mutually adjacent turns of the slot. The pump capacity does not change over the time of operational use.

It should be emphasized especially that foreign particles entering during assembly or with the liquid to be pumped do not perforce lead to a rapid failure of the pump according to the invention. Rather, the elasticity of the elastomer utilized assures that wear will be compensated and thus assures the operation of the pump over a longer service life.

The elastomer utilized is preferably a rubber such as nitrile-butadiene rubber (NBR). Fluorocarbon rubber (FPM, FKM) has also been shown to be advantageous with which longer service lives have been obtained.

The dimensions of the spiral slot lie in the range of several tenths to hundredths of a millimeter. The form of the slot is advantageously such that the width is approximately four times as great as its depth. With this slot geometry, it has been shown that it is only necessary to extend the length of the spiral to increase the pumping pressure without having any influence on the pumping capacity. On the other hand, and without influence on the pumping pressure, the pumping capacity is adjustable by means of the dimensions.

In a preferred embodiment of the invention, the body carrying the spiral slot together with the wall structure is configured as an injection-molded piece. The sealing rings which seal the pump with respect to the ambient can be simultaneously formed on this body in the form of sealing lips which are sprayed on. This piece is easy to manipulate and to assemble. If the body is configured as a stator, then this body can be pushed onto each rotating shaft having a smooth outer surface in order to form the pump. An exchange of a defective oil pump is carried out by a simple pulling off of the defective stator and pushing on a new stator. A tilting occurring during assembly of the stator is easily compensated for because of the elastic elastomer and without permanent damage.

If the injection-molded piece is to compensate for larger tolerances than the elasticity of the elastomer utilized will permit, then at least one cutout can be provided in the form of a radial hollow space for increasing the radial elasticity of the injection-molded piece. It can be advantageous to seat an elastic packing in the cutout defining the hollow space with this packing having an elasticity greater than that of the elastomer used. The elasticity of the packing is preferably much greater than that of the elastomer. Large tolerances are possible with the pump according to the invention. If, for example, large tolerances are permitted between the stator and the rotor, the wall structure could deform during assembly of the pump to such an extent that the form of the spiral slot changes greatly and so that a change in the pumping capacity could follow. By increasing the elasticity of the injection-molded piece in the radial direction, this undesired deformation of the spiral slot can be avoided.

In a simple embodiment of the pump according to the invention, the wall structure can be sprayed onto a rigid carrier which can preferably be a cylindrical sleeve with the sealing rings likewise being sprayed onto the carrier so that the pump according to the invention again comprises only two parts which have to be assembled with one another.

BRIEF DESCRIPTION OF THE DRAWINGS

The invention will now be described with reference to the drawings wherein:

FIG. 3a is a side elevation view, in axial section, of the stator of FIG. 2 with hollow spaces provided in the stator;

FIG. 3b is a radial section taken through the stator of FIG. 1;

FIG. 5a is a section view of the pump of FIG. 5 taken along line Va—Va thereof;

DESCRIPTION OF THE PREFERRED EMBODIMENTS OF THE INVENTION

Figure 1:
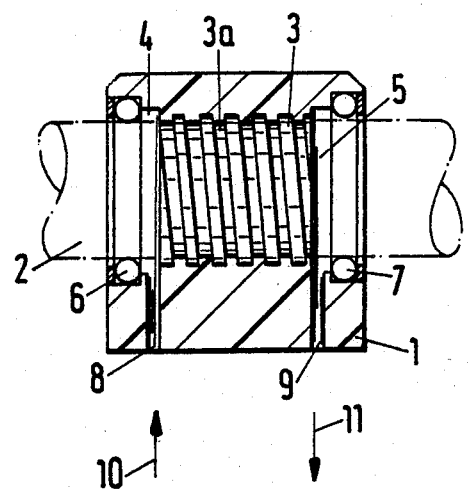
FIG. 1 is a side elevation view, in axial section, of an elastomeric stator having a winding-shaped spiral slot.

The basic principle of the invention is illustrated in FIG. 1 with a simple embodiment. The stator 1 is mounted so as to be coaxial to a shaft which defines the rotor 2. The stator 1 has a screw-like spiral slot 3 machined into its inner surface facing toward the rotor 2. This spiral slot opens at its input into an annular slot 4 and, at its end, the spiral slot 3 opens into an annular slot 5 of the stator 1. The annular slots 4 and 5 are sealed off at the axial ends of the stator 1 by means of respective sealing rings in the form of O-rings (6, 7). The annular slot 4 communicates with a suction connection 8 and the annular slot 5 communicates with a pressure connection 9.

According to the invention, at least the wall structure 3a bounding the spiral slot 3 is made of an elastomer. In the embodiment of FIG. 1, the entire stator 1 is produced as an injection-molded piece made of elastomer. The shaft forming the rotor 2 is smooth on its peripheral surface facing toward the spiral slot 3. When the shaft lying closely against the stator rotates, the liquid completely filling the spiral slot is dragged along from the suction connection 8 to the pressure connection 9 because of its viscosity thereby causing a pumping of the fluid in the direction of the arrows 10 and 11. The pumped quantity is very small and is approximately in the order of magnitude of 20 cm$^3$ per hour. The spiral slot 3 is approximately four times as wide as it is deep. The dimensions are between several tenths and hundredths of a millimeter.

To change the pumping pressure, more or less turns of the spiral slot are provided. If it is intended to vary the quantity pumped, this can be achieved by changing the depth and width of the slot for which the speed of the rotor should be considered. What is significant here is that the quantity pumped and the pumping pressure are adjustable independently of each other.

In a screw pump of the kind described above, it is essential that no air enters the spiral slot 3 since then the drag action and thereby the pumping capacity of the pump are at risk. Because of the elastomeric configuration of the wall structure 3a, it is assured that the wall structure is absolutely seal-tight at the smooth surface of the shaft to be rotated so that a short circuit occurring because of inadequate sealing is avoided between neighboring slot turns. Because of the elasticity of the elastomer itself within appropriate limits, a compensation of tolerances is possible so that the pump according to the invention is easily produced and mounted. Failures of the pump caused by tilting during assembly are substantially avoided.

Figure 2:
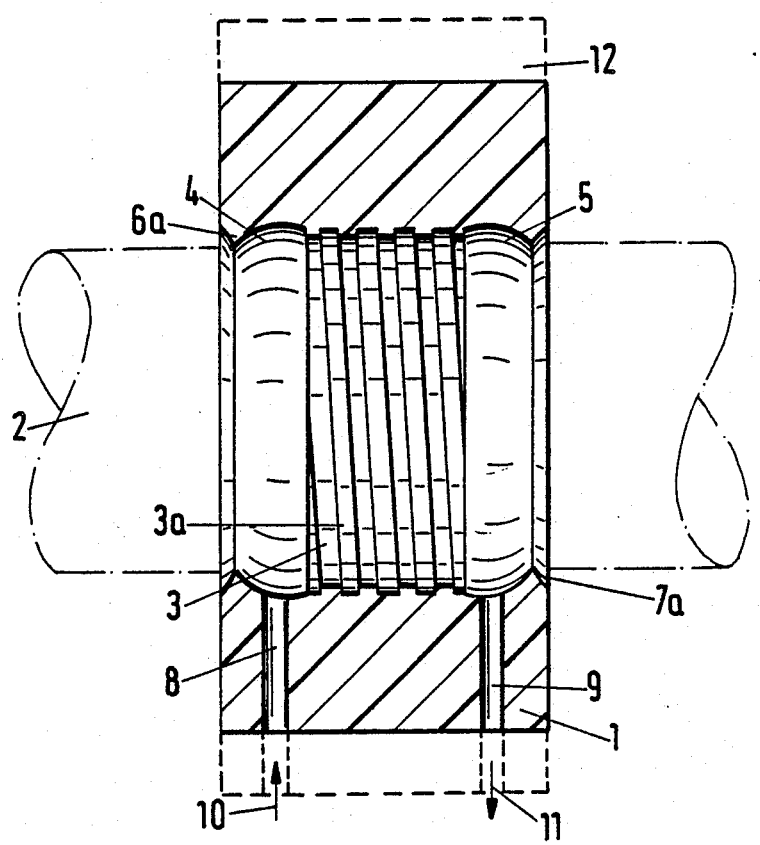
FIG. 2 is a side elevation view, in axial section, taken through the stator of FIG. 1 having sprayed on sealing lips.
Figure 4:
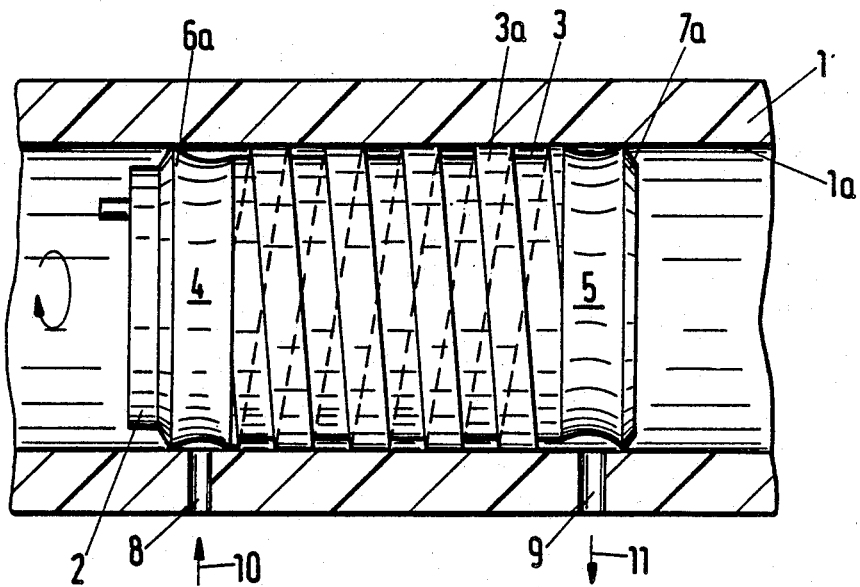
FIG. 4 is a side elevation view of a pump which includes a rotor in the form of an elastomeric injection-molded piece.

In a further embodiment of the invention, the sealing rings (6, 7) are sprayed onto the stator as sealing lips (6a, 7a) or are formed as sealing lips (6a, 7a) on the stator as a single piece by injection molding as shown in FIG. 2. A stator 1 of this kind is preferred and forms a reliable, simple and cost effective pump having a long service life when pushed onto a smooth shaft. The pump can be advantageously utilized as a lubricating oil pump for two-cycle engines such as two-cycle injection engines for handheld portable tools such as motor-driven chain saws or the like.

The oil pump of the invention is used in these engines to provide a separate lubrication in order to supply the piston path, the bearings and the like with oil. It is advantageous for the pressure connection to open into the crankcase of the engine, for example, via a check valve opening in the direction toward the crankcase. In this way, a drop in pressure is obtained from the suction connection to the pressure connection which supports the pumping action of the pump itself. This drop in pressure would be available during operation of the engine even without the pump. If pumping problems occur when the pump starts up, for example, when the oil is cold or there is minimal oil foam, these problems can easily be overcome. The pressure connection can also advantageously open into the intake pipe.

The pump is also advantageously usable for metering lubricating oil to the saw chain. A pressure drop from the suction connection to the pressure connection supporting the pumping action during start up of the pump can also be generated by other means.

The suction line and the pressure line can be connected directly to the elastomeric injection-molded piece of the stator 1. A sleeve 12 made of a rigid material such as steel or the like surrounding the stator has been shown to be advantageous. The sleeve 12 is shown in phantom outline in FIG. 2. The suction line and the pressure line can be connected in a pressure-tight manner to such a sleeve.

One or more hollow spaces are provided in the stator body as shown in FIGS. 3a and 3b in order to impart a higher elasticity to the elastomeric injection-molded piece; this is especially the case when a steel sleeve 12 or the like restricts the stator. These hollow spaces are provided as open cutouts 13 which extend from one axial end face of the injection-molded piece to the other axial end face thereof. The open cutouts extend over a peripheral angle of approximately 100° as can be seen especially in the section view of FIG. 3b. Only three cutouts are shown in FIG. 3b because of their extension in the peripheral direction. The number of cutouts can be correspondingly adapted by selecting appropriate dimensions for a particular use.

It can be advantageous to fill out the hollow chamber or hollow chambers with a correspondingly formed packing made of a material having an elasticity greater than that of the elastomer used. Preferably, the elasticity of the material of the packing is substantially greater than that of the elastomer.

As an alternate to the embodiments shown in FIGS. 1 to 3b, it can be advantageous to provide the rotor 2 as an injection-molded piece having the screw-shaped spiral slot 5 with the rotor 2 rotating in a cylindrical stator 1. The screw-shaped wall structure 3a bounding the spiral slot 3 lies seal-tight against the inner surface 1a of the stator 1. The sealing lips (6a, 7a) which seal off the annular slots 4 and 5 at respective ends of the rotor 2 can again be produced by spraying on or injection molding the same as one piece on the rotor body. The operation of this pump corresponds identically to those shown in FIGS. 1 to 3b.

Figure 5:
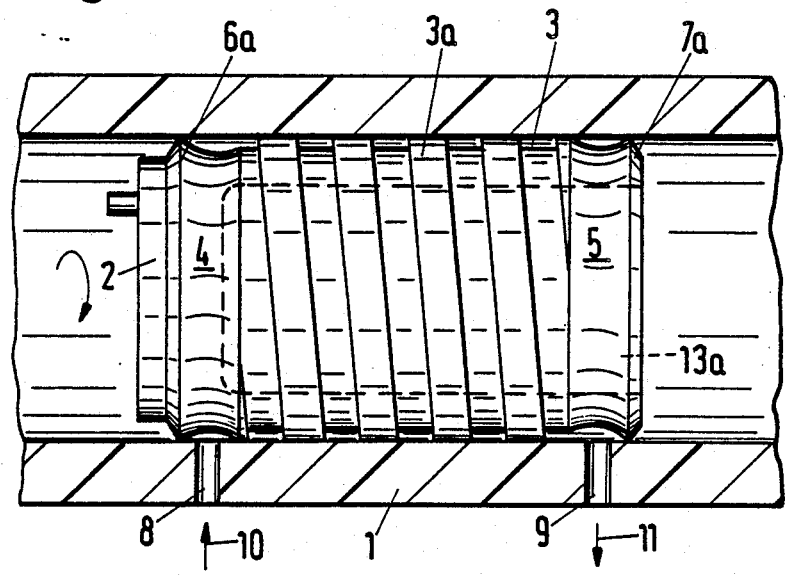
FIG. 5 is a side elevation view of the pump of FIG. 4 wherein the rotor is provided with an elastic packing.

In order to obtain a higher elasticity of the body carrying the spiral slot 3 as was done in the embodiment of FIGS. 3a and 3b, the embodiment of FIG. 5 is provided with a central hollow space 13a which is open at only one end face of the rotor 2. As shown in FIG. 5a, the hollow space 13a is filled with a packing 13b having a high elasticity in order to obtain a lower stiffness of the rotor 2 necessary for the operation of the pump. With this configuration, large tolerances can still be compensated for without the slot geometry being changed because of deformation.

Figure 6:
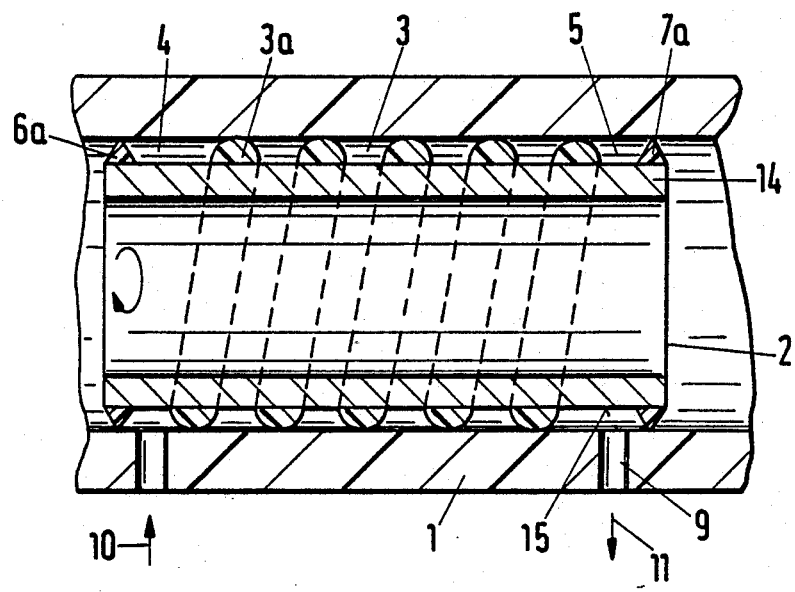
FIG. 6 is a side elevation view, in axial section, taken through a pump having a rotor including a rigid rotor sleeve having a wall structure sprayed thereon for forming the spiral slot.

In the embodiments of FIGS. 6 to 9, the body supporting the wall structure 3a of the spiral slot 3 is a cylindrical sleeve 14. In FIG. 6, this sleeve defines the rotor 2. The rotor 2 is arranged in the stator 1 and carries the sprayed-on wall structure 3a of the spiral slot 3 on its outer surface 15. Respective sealing lips 6a and 7a are sprayed onto respective axial ends of the sleeve 14. Even a simple embodiment of this kind in which essentially only the wall structure 3a of the spiral slot 3 is made of elastomer provides the advantages initially described herein.

Figure 7:
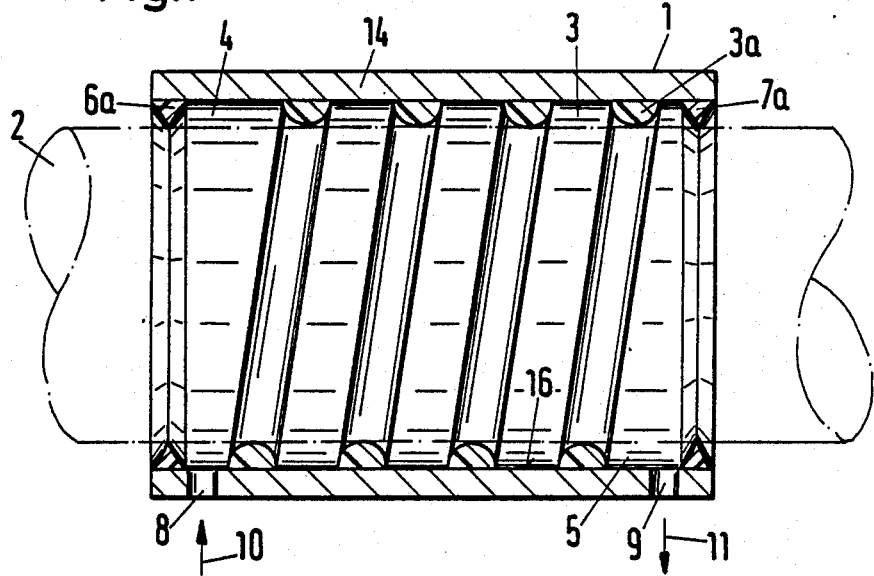
FIG. 7 is an axial section taken through a rigid stator sleeve having a wall structure sprayed thereupon for forming the spiral slot.

In FIG. 7, the reverse principle of FIG. 6 is shown. The wall structure 3a is sprayed onto the inner surface 16 of the sleeve 14 as are the sealing lips 6a and 7a. The wall structure 3a lies against the smooth outer surface of a rotor 2 formed by the shaft.

Figure 8:
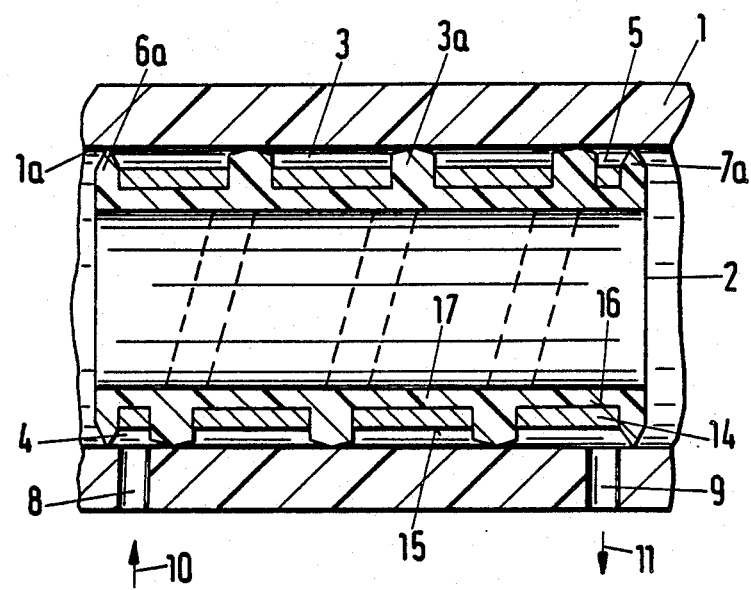
FIG. 8 is an axial section through the rigid rotor sleeve of FIG. 6 having a sprayed-on elastomeric sleeve defining a wall structure extending through a spirally-shaped cutout in the rigid sleeve to form the spiral slot; and, FIG. 9 is an axial section through the rigid stator sleeve of FIG. 7 having a sprayed-on elastomeric sleeve whose wall structure penetrates through a screw-shaped cutout in the rigid stator sleeve and defines the spiral slot.

The embodiment of FIG. 8 corresponds in its essential configuration to that of FIG. 6. The wall structure 3a is however now not sprayed onto the outer surface; instead, the wall structure 3a projects from an elastomeric sleeve 17 through a screw-shaped spiral slit milled into the rigid sleeve 14 in order to form the spiral slot 3 on the outer surface 15 of the sleeve 14. The sealing lips (6a, 7a) define the ends of the elastomeric sleeve 17 and engage around the axial ends of the rigid sleeve 14 and seal tightly against the smooth inner surface 1a of stator 1. The elastomeric sleeve 17 is tightly connected to the rigid sleeve 14 and is preferably sprayed on or vulcanized thereon.

Figure 9:
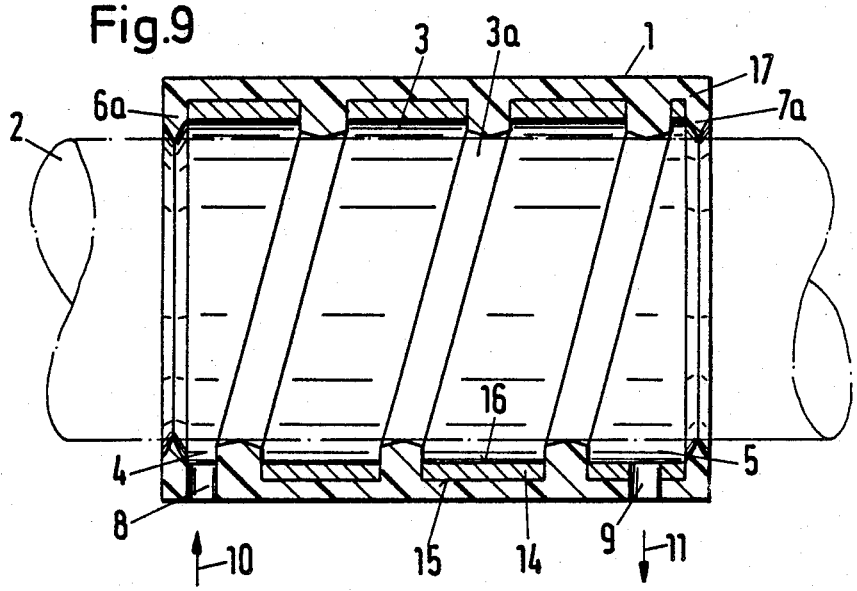

The rigid sleeve 14 forms the stator 1 in the embodiment of FIG. 9. An elastomeric sleeve 17 is sprayed onto the outer surface 15 of this rigid sleeve 14. The sleeve 17 carries a screw-shaped wall structure 3a which extends through a corresponding screw-shaped spiral slit in the rigid sleeve 14 to form the screw-shaped spiral slot 3 on the inner surface 16. The wall structure 3a lies against the smooth outer surface of a rotor 2 to form the pump. The axial ends of the elastomeric sleeve 17 are again configured as sealing lips (6a, 7a). These sealing lips engage around the axial ends of the rigid sleeve 14 and lie seal-tight against the smooth outer surface of the rotor 2.

It is understood that the foregoing description is that of the preferred embodiments of the invention and that various changes and modifications may be made thereto without departing from the spirit and scope of the invention as defined in the appended claims.

What is claimed is:

1. A pump for pumping viscous fluids, the pump comprising:
    a first body defining a stator having a longitudinal stator axis;
    a second body defining a rotor having a longitudinal rotor axis, said rotor being rotatably mounted in said stator so as to be coaxial therewith;
    said stator having a smooth inner wall surface facing said rotor and said rotor having a smooth outer wall surface in seal-tight contact engagement with said smooth inner wall surface, said wall surfaces conjointly forming a surface interface;
    one of said bodies having a wall structure made of an elastomer at said surface interface;
    said wall structure made of elastomer having a screw-shaped spiral slot with a plurality of turns and respective ends formed therein so as to leave a spiral elastomer wall section having a top surface in seal-tight contact engagement with the smooth wall surface of the other one of said bodies to define said interface and to prevent a hydraulic short circuit between each two mutually adjacent ones of said turns notwithstanding wear between said stator and said rotor;
    suction connection means formed at one of said ends for conducting the viscous fluid to be pumped into said slot; and,
    pressure connection means formed at the other one of said ends for conducting the viscous fluid out of said slot.

2. The pump of claim 1, said elastomer being rubber.

3. The pump of claim 1, said elastomer being nitrile-butadiene rubber (NBR).

4. The pump of claim 1, said elastomer being a fluorocarbon rubber.

5. A pump for pumping viscous fluids, the pump comprising:
    a first body defining a stator having a longitudinal stator axis;
    a second body defining a rotor having a longitudinal rotor axis, said rotor being rotatably mounted in said stator so as to be coaxial therewith;

said stator having a smooth inner wall surface facing said rotor and said rotor having a smooth outer wall surface in seal-tight contact engagement with said smooth inner wall surface, said wall surfaces conjointly defining a surface interface;

one of said bodies having a wall structure made of an elastomer at said surface interface so as to be in contact engagement with the smooth wall surface of the other one of said bodies;

said wall structure being configured to define a screw-shaped spiral slot having respective ends and bounded by the smooth wall surface of said other one of said bodies;

suction connection means formed at one of said ends for conducting the viscous fluid to be pumped into said slot;

pressure connection means formed at the other one of said ends for conducting the viscous fluid out of said slot; and, said spiral slot defining a cross section having a depth and a width, said width being approximately four times said depth.

6. The pump of claim 1, said one body including said wall structure and being formed as a single injection-molded piece.

7. A pump for pumping viscous fluids, the pump comprising:

a first body defining a stator having a longitudinal stator axis;

a second body defining a rotor having a longitudinal rotor axis, said rotor being rotatably mounted in said stator so as to be coaxial therewith;

said stator having a smooth inner wall surface facing said rotor and said rotor having a smooth outer wall surface in seal-tight contact engagement with said smooth inner wall surface, said wall surfaces conjointly defining a surface interface;

one of said bodies having a wall structure made of an elastomer at said surface interface so as to be in contact engagement with the smooth wall surface of the other one of said bodies;

said wall structure being configured to define a screw-shaped spiral slot having respective ends and bounded by the smooth wall of said other one of said bodies;

suction connection means formed at one of said ends for conducting the viscous fluid to be pumped into said slot;

pressure connection means formed at the other one of said ends for conducting the viscous fluid out of said slot;

said one body including said wall structure and being formed as a single injection-molded piece;

said pump having respective longitudinal ends and including sealing rings formed on said one body at said longitudinal ends, respectively, for axially sealing the pump; and, said sealing rings being sealing lips formed as part of said single injection-molded piece.

8. The pump of claim 7, comprising a rigid sleeve surrounding said injection-molded piece.

9. The pump of claim 8, said rigid sleeve being a steel sleeve.

10. The pump of claim 6, said injection-molded piece including at least one hollow space formed therein at a location spaced radially of said wall structure.

11. The pump of claim 10, comprising packing means filling said hollow space.

12. The pump of claim 11, said elastomer having a predetermined elasticity and said packing means having an elasticity greater than the elasticity of said elastomer.

13. The pump of claim 1, said one body comprising a carrier and said wall structure being formed by spraying an elastomeric material onto said carrier.

14. The pump of claim 13, said carrier being a sleeve having a spiral cutout formed therein; and, said wall structure including an elastomeric sleeve formed on one side of said sleeve with a projection extending through said spiral cutout to form said spiral slot on the other side of said sleeve.

15. The pump of claim 14, said elastomeric sleeve having two longitudinal ends and including two sealing lips formed thereon at corresponding ones of said longitudinal ends; said sealing lips each being configured so as to be in sealing contact engagement with the smooth wall surface of the other one of said bodies.

16. The pump of claim 13, said carrier being a sleeve made of rigid material.

17. The pump of claim 16, said rigid material being steel.

18. The pump of claim 1, said one body being said stator and said other body being a rotating shaft.

19. The pump of claim 7, said injection-molded piece including at least one hollow space formed therein at a location spaced radially of said wall structure.

20. The pump of claim 19, comprising packing means filling said hollow space.

21. The pump of claim 20, said elastomer having a predetermined elasticity and said packing means having an elasticity greater than the elasticity of said elastomer.

22. A pump for pumping viscous fluids including lubricating oil, the pump comprising:

a first body defining a stator having a longitudinal stator axis;

a second body defining a rotor having a longitudinal rotor axis, said rotor being rotatably mounted in said stator so as to be coaxial therewith;

said stator having a smooth inner wall surface facing said rotor and said rotor having a smooth outer wall surface in seal-tight contact engagement with said smooth inner wall surface, said wall surfaces conjointly forming a surface interface;

one of said bodies having a wall structure made of an elastomer at said surface interface so as to be in contact engagement with the smooth wall surface of the other one of said bodies;

said wall structure including a screw-shaped spiral wall section made of an inherently elastic elastomer;

said wall section and the smooth wall surface of the other one of said bodies conjointly defining a spiral passage having respective ends;

said wall section having a top surface in seal-tight contact engagement with said smooth wall surface to define said interface and to resiliently press against said wall surface so as to compensate for wear between said rotor and stator and prevent a hydraulic short circuit at said interface between each two mutually adjacent ones of said turns;

suction connection means formed at one of said ends for conducting the viscous fluid to be pumped into said slot; and, pressure connection means formed at the other one of said ends for conducting the viscous fluid out of said slot.

* * * * *

UNITED STATES PATENT AND TRADEMARK OFFICE
CERTIFICATE OF CORRECTION

PATENT NO. : 4,938,660

DATED : July 3, 1990

INVENTOR(S) : Karsten Schöne, Hans Nickel, Werner Geyer and Roland Schierling

It is certified that error appears in the above-identified patent and that said Letters Patent is hereby corrected as shown below:

On the title page, [21] delete "Appl. No.: 373,636" and substitute -- Appl. No.: 363,633 -- therefor.

In column 1: delete lines 1 and 2 and substitute

-- PUMP FOR VISCOUS FLUIDS

In column 7, line 44: insert -- surface -- between "wall" and "of".

Signed and Sealed this

Eighth Day of October, 1991

Attest:

HARRY F. MANBECK, JR.

*Attesting Officer*    *Commissioner of Patents and Trademarks*